July 8, 1924.
E. INGELFINGER
LUBRICATOR DEVICE
Filed May 18, 1922
1,500,873
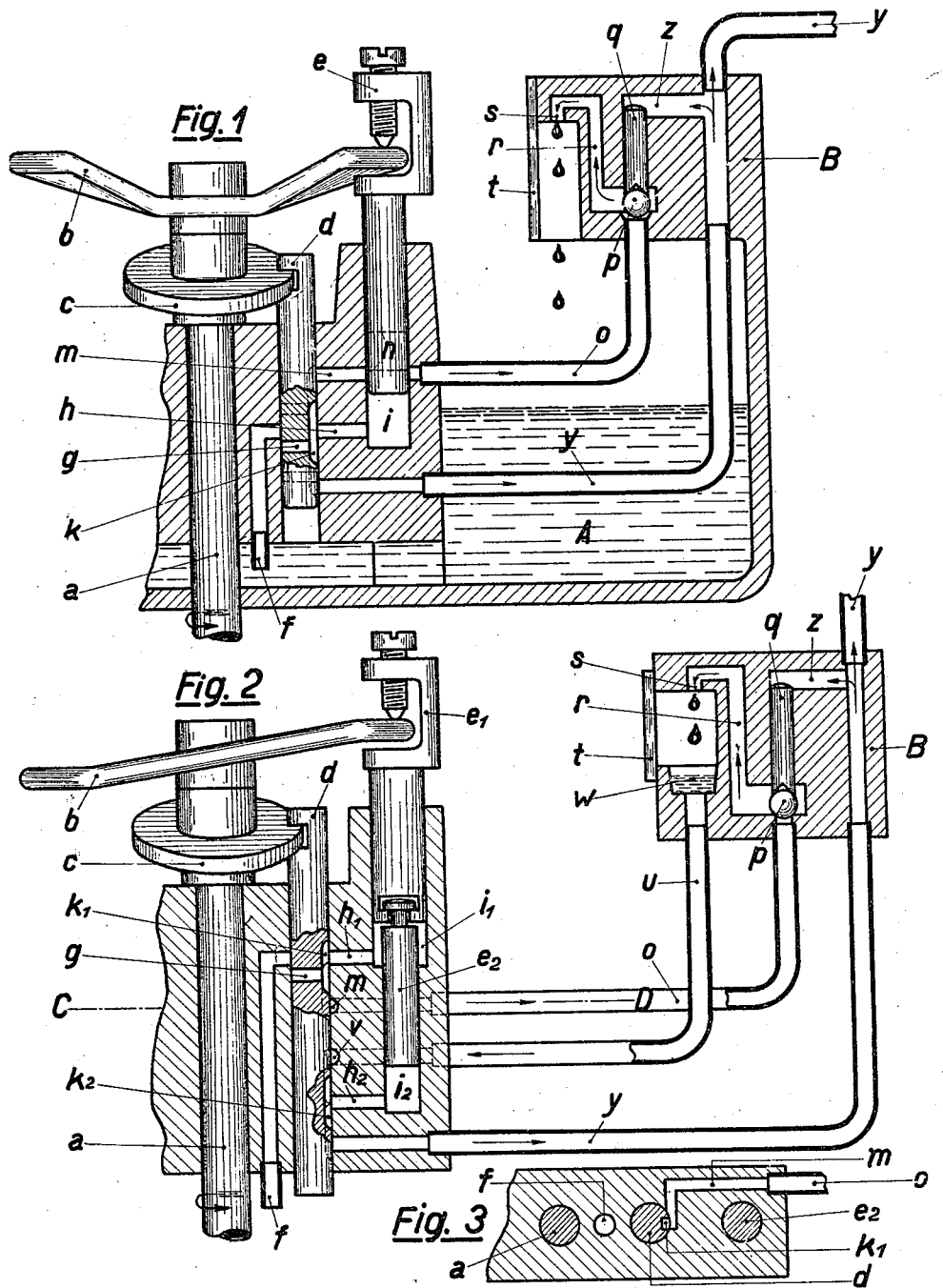

Patented July 8, 1924.

1,500,873

UNITED STATES PATENT OFFICE.

EDMUND INGELFINGER, OF WAIBLINGEN, GERMANY, ASSIGNOR TO ROBERT BOSCH AKTIENGESELLSCHAFT, OF STUTTGART, GERMANY.

LUBRICATOR DEVICE.

Application filed May 18, 1922. Serial No. 561,929.

*To all whom it may concern:*

Be it known that I, EDMUND INGELFINGER, a citizen of Germany, residing at Waiblingen, Germany, have invented certain new and useful Improvements in a Lubricator Device, of which the following is a specification.

The known lubricating pumps with drop indicator are possessed of the drawback that the fall of the drops cannot be utilized as a comparison measure for the amount of oil actually delivered to the lubrication place. The amount of the oil appearing in the drop indicator is always the same, irrespective of the height of the counter-pressure in the lubricating pipe, viz, whether, consequently, the amount of oil conveyed to the lubrication place is small or large. The reason for this behaviour lies in the fact that the oil supply to the drop indicator is quite independent of the oil supply to the lubrication place.

In order to make the drop indicator give a faithful image of the procedures in the lubrication pipe, the supply of the oil to the drop indicator must take place under the same pressure as the supply to the lubrication place. For this purpose, and conformably with this invention a shutting-off member is inserted into the pipe conducting the oil to the drop indicator and the liquid-pressure existing in the lubrication pipe is made to act upon that shutting-off member. The variations in the volumetric efficiency of the pump, which are caused by variations in the counter-pressure in the lubrication pipe, become then active at the drop place in the same degree as at the lubrication place.

In order to make my invention more clear, I refer to the accompanying drawing, in which two forms of construction of the subject-matter of the invention are illustrated, by way of example, in rather diagrammatical representation. Fig. 1 shows the one of them, Fig. 2 the other, and Fig. 3 is a section in line C—D of Fig. 2.

Referring to Fig. 1 $a$ is a shaft which, if being rotated reciprocates a working piston $e$ and a control piston $d$ by means of two cam-disks $b$ and $c$ affixed to the free end of said shaft. The piston $d$ has a lateral slot which is engaged by the obliquely disposed cam-disk $c$, and the piston $e$ has a special head with an adjusting screw as shown, also forming a kind of slot which is engaged by the rim of the cam-disk $b$. The configuration of the disks $b$ and $c$ is such that, at one revolution of the shaft $a$, the piston $d$ is reciprocated one time, the piston $e$, however, two times. During the suction stroke the oil is sucked from a chamber A through a vertical channel $f$ provided in the body of the device, a horizontal channel $g$ provided in the control piston $d$, and a horizontal channel $h$ also provided in the body of the device, from which latter channel the oil gets into the cylinder $i$ below the piston $e$. In the position of the parts as shown in Fig. 1 the piston $d$ is just in its middle position on its downward way. Having arrived in its lowermost position, a lateral groove $k$ provided in it connects the channel $g$ with a pipe $y$ which runs to the lubrication place and into which is inserted the drop indicator B.

After the piston $e$ has completed that delivery stroke, the piston $d$ is moved upwards until its position is such that the channels $f$ and $h$ are again connected with each other by the channel $g$. Now the piston $e$ moves upwards and sucks a second time oil from the chamber A into the cylinder $i$, the way being the same as at the former time. After this, the piston $d$ moves further upwards until its groove $k$ connects the channel $h$ with a higher situated channel $m$ from which a pipe $o$ runs to the drop indicator B. The connection between the channel $m$ and the pipe $o$ is established by an oblong hole $n$ traversing the piston $e$.

The drop indicator contains the shutting-off member mentioned in the preamble. It consists in the example in question of a ball valve $p$ located upon the mouth of the pipe $o$ and of a plunger $q$ located over that ball. The diameter of the plunger corresponds to that of the pipe $o$. The space above the plunger is connected by a passage $z$ with the passage of the tube $y$, as shown. The plunger and the ball are, thus, subjected to the pressure existing in the tube $y$ and the ball is not lifted off its seat until the pressure in the tube $o$ is greater than the pressure in the tube $y$. Only then the ball and the plunger are raised, and the oil present in the tube $o$ can get through a passage $r$ to the drop forming place or drop-feeding part $s$ from where it falls back into the chamber A. $t$ is a small glass plate forming, together with a lateral cavity of the body B, a chamber, at the top of which the drop-forming place is located and through which the drops fall down. The drop-forming place or drop-feeding part of the indicator is, thus, protected against being soiled or obstructed by dirt or other impurities.

With this arrangement there appears at the drop-forming place or drop-feeding part of the indicator just as much oil as arrives at the lubrication place because the pressure to which the plunger $q$ is subjected is the same at both its ends. The piston $e$ delivers the oil from the chamber A alternately into the tubes $o$ and $y$. But instead of making use of one delivery piston two such ones may be employed whereby the effect is still more improved. The two pistons may make their suction strokes and their delivery strokes at the same time. The additional effect resides in this that the load of the shutting-off members ($p$ and $q$, or their equivalents) just during the oil supply to the drop-forming place or drop-feeding part of the indicator corresponds exactly to the pressure existing in the lubrication tube whilst the oil is conveyed to the lubrication place.

Such a form of construction is shown in Figs. 2 and 3. The cam-disk $c$ operates in this instance two suction and delivery pistons $e^1$ and $e^2$, of which the latter is suspended from the former, as shown. Corresponding to these two pistons, the control piston $d$ has two lateral grooves $k^1$ and $k^2$. Supposing the pistons $e^1$, $e^2$ rise, the first sucks the oil through channels $f$, $g$, $h^1$ into the space $i$, just as in Fig. 1, $g$ and $h^1$ being connected with each other at that time by the groove $k^1$. The second piston $e^2$ sucks the oil into the space $i^2$ through the channel $h^2$, the groove $k^2$, channel $v$ and a pipe $u$, out of a small space $w$ catching up the drops falling from the drop-forming space in the drop indicator B. The connection between $h^2$ and $v$ is established when the piston $d$ is in its upper position.

When the pistons $e^1$, $e^2$ commence to go downwards the position of the piston $d$ is such that the channels $h^1$ and $m$ are connected by the groove $k^1$, and the channels $h^2$ and $y$ are connected by the groove $k^2$. Thus, the oil from the cylinder $i^1$ is forced into the pipe $o$ and the oil from the cylinder $i^2$ is forced into the pipe $y$. The oil passing through the pipe $o$ gets finally to the drop-forming place, and the oil passing through the pipe $y$ gets finally to the lubrication place. The plunger $q$ is acted on at both ends, just as in Fig. 1, and its manner of operation is, in general, the same as in the first described instance. In particular, the plunger $q$ is loaded from above by the pressure existing in the pipe $y$, and as the diameter of the plunger is equal to that of the pipe $o$, it is subjected from below to a pressure which balances that from above. The volumetric efficiency of the pistons $e^1$ and $e^2$ is the same, presupposed, that the two pistons deliver equal amounts of oil, or, in other words, that the active area of the piston $e^1$ is the same as that of the piston $e^2$.

Having now described my invention, what I claim as new and desire to secure by Letters Patent of the United States is:

1. In a lubrication device, the combination with a lubrication pump, of a drop-indicator having a drop-feeding part, a pipe leading from said lubrication pump to said indicator, a pipe leading from said pump for delivery of oil for lubrication, a shut-off member controlled by pressures on opposite faces thereof arranged between said first mentioned pipe and said pipe-feeding part of said indicator and having one face exposed to pressures in said first mentioned pipe, and a pressure-transmitting connection between said second mentioned pipe and the opposite face of said shut-off member.

2. In a lubrication device, the combination with a lubrication pump, of a drop-indicator having a drop-feeding part, a pipe leading from said lubrication pump to said indicator, a pipe leading from said pump for delivery of oil for lubrication, shut-off means consisting of a ball-valve located between said first mentioned pipe and said drop-feeding part of said indicator and exposed to pressures in said first mentioned pipe and of a plunger bearing against said ball-valve to transmit pressures thereto counter to the pressures in said first mentioned pipe, and a pressure-transmitting connection between said second-mentioned pipe and the free end of said plunger.

3. In a lubrication device, the combination with a lubrication pump; of an indicator having a sight-feed conduit, an oil line leading from said pump to said indicator, an oil line from said pump for delivery of oil for lubrication, and means determining the flow of oil from said pump to said indicator in correspondence with the delivery of oil from said pump for lubrication, said means comprising a shut-off member controlled by differential pressures on opposite faces thereof, said shut-off member arranged to control the flow through said first-mentioned oil line and having one face thereof exposed to liquid pressure in said line and a pressure-transmitting connection with said second-mentioned oil line arranged to expose the opposite face of said shut-off member to the pressure of liquid in said second-mentioned oil line.

4. In a lubrication device, the combination with a lubrication pump, of an indicator having a sight-feed conduit, a pipe leading from said pump to said indicator, another pipe from said pump for delivery of oil for lubrication, and means determining the flow of oil from said pump to said indicator in correspondence with the delivery of oil from said pump for lubrication, said means comprising a valve arranged between said first mentioned pipe and said indicator, a controlling member therefor functioning by differential pressures on opposite faces thereof and pressure-transmitting connections subjecting the opposite faces of said controlling member to the liquid pressures in said respective pipes.

In testimony whereof I have affixed my signature in presence of two witnesses.

EDMUND INGELFINGER. [L. S.]

Witnesses:
    OTTO WAGNER. [L. S.]
    VIKTOR BENTZ. [L. S.]